United States Patent [19]

Rodgers et al.

[11] Patent Number: 5,128,539

[45] Date of Patent: Jul. 7, 1992

[54] APPARATUS HAVING REDUCED BACKGROUND FOR MEASURING RADIATION ACTIVITY IN AEROSOL PARTICLES

[75] Inventors: John C. Rodgers, Santa Fe, N. Mex.; Andrew R. McFarland, College Station, Tex.; Carlos A. Oritz, Bryan, Tex.; William H. Marlow, College Station, Tex.

[73] Assignee: The United States of America as represented by the United States Department of Energy, Washington, D.C.

[21] Appl. No.: 567,561

[22] Filed: Aug. 15, 1990

[51] Int. Cl.⁵ .............................................. G01T 7/04
[52] U.S. Cl. ..................................... 250/255; 73/28.05
[58] Field of Search ................. 73/28.01, 28.02, 28.04, 73/28.05, 28.06; 250/304, 255

[56] References Cited

U.S. PATENT DOCUMENTS

| | | |
|---|---|---|
| 3,938,366 | 2/1976 | Wertlake et al. .............. 73/28.06 |
| 4,590,792 | 5/1986 | Chaing ........................... 73/28.06 |
| 4,607,165 | 8/1986 | Burghoffer et al. ......... 250/370.02 X |
| 4,700,067 | 10/1987 | Carossi et al. ................ 250/304 X |
| 4,701,621 | 10/1987 | Kaiser et al. ................. 250/304 X |
| 4,796,475 | 1/1989 | Marpel ......................... 73/28.05 X |
| 4,942,297 | 7/1990 | Johnson et al. ................ 250/304 |

OTHER PUBLICATIONS

Antoon W. Van Der Vooren et al., "An Evaluation of Unattached Radon (And Thoron) Daughter Measurement Techniques", Health Physics, 42, 801 (1982).
Charlett J. Busigin et al., "Measurement of Charged and Unattached Fractions of Radon and Thoron Daughters in Two Canadian Uranium Mines", Health Physics, 44, 165 (1983).
Y. F. Su et al., "Experimental Measurements of the Diffusion Coefficient of $^{212}$Pb", Health Physics, 56, 309 (1989).
Thomas J. Yule, "An On-Line Monitor for Alpha-Emitting Aerosols", IEEE Transactions on Nuclear Science NS-25, 762 (1978).
J. M. Alexander, "A Continuous Monitor for Prompt Detection of Airborne Plutonium", Health Physics, 12, 553 (1966).
Gordon K. Rusch et al., "The ZPR-9 Airborne Plutonium Monitoring System", IEEE Transactions on Nuclear Science NS-23, 690 (1976).
Mukund Ramamurthi et al., "On Improving the Validity of Wire Screen 'Unattached' Fraction Rn Daughter Measurements", Health Physics, 56, 189 (1989).
J. C. Elder et al., "Plutonium Aerosol Size Characteristics", Health Physics, 27, 45 (1974).

*Primary Examiner*—Constantine Hannaher
*Assistant Examiner*—Jacob M. Eisenberg
*Attorney, Agent, or Firm*—Samuel M. Freund; Paul D. Gaetjens; William R. Moser

[57] ABSTRACT

Apparatus having reduced background for measuring radiation activity in aerosol particles. A continuous air monitoring sampler is described for use in detecting the presence of alpha-emitting aerosol particles. An inlet fractionating screen has been demonstrated to remove about 95% of freshly formed radon progeny from the aerosol sample, and approximately 33% of partially aged progeny. Addition of an electrical condenser and a modified dichotomous virtual impactor are expected to produce considerable improvement in these numbers, the goal being to enrich the transuranic (TRU) fraction of the aerosols. This offers the possibility of improving the signal-to-noise ratio for the detected alpha-particle energy spectrum in the region of interest for detecting TRU materials associated with aerosols, thereby enhancing the performance of background-compensation algorithms for improving the quality of alarm signals intended to warn personnel of potentially harmful quantities of TRU materials in the ambient air.

14 Claims, 9 Drawing Sheets

APPARATUS HAVING REDUCED BACKGROUND FOR MEASURING RADIATION ACTIVITY IN AEROSOL PARTICLES

The United States Government has rights in this invention pursuant to Contract No. W-7405-ENG-36 between the U.S. Government and the Regents of The University of California.

BACKGROUND OF THE INVENTION

The present invention relates generally to continuous air monitors, and more particularly to the reduction in background in the measurement of radioactive emission activity in aerosol particles.

The presence of aerosol particles which emit alpha, beta, gamma, and x-ray radiations (e.g., aerosol particles containing transuranic (TRU) elements) is detected through use of continuous air monitors (CAMs) in the workplace or in stacks. Typically, these devices collect aerosol particles on a substrate (e.g., a filter or an inertial impaction collection element) and detect the radioactive emissions (generally alpha emissions in the case of TRUs) employing a planar solid state detector placed parallel to the collector with a gap of approximately 5 mm between the detector and the collector. In the case of a filter collector, which is the most common collection element, the aerosol is drawn into the gap between the filter and detector and then passes through the filter where particle collection occurs In general, as the radionuclides associated with a collected aerosol sample decay, the alpha particles or other radiations which leave the collected aerosol particles in the solid angle of the detector/filter configuration are registered by the detector. It is common to employ a detector which provides a measurement of the kinetic energy of the alpha particles or other radiations, but in some devices only a gross count of activity is obtained. In a perfect environment (e.g., a vacuum chamber sample holder with the sample being a monomolecular layer on a collection substrate) the energy of any decay event of a given isotope would be registered as a constant. In turn, this suggests that through use of a multichannel analyzer (MCA), accumulation of the counts associated with a given energy channel would provide a measurement of the concentration of a particular isotope in the aerosol state. However, the CAM environment is not ideal, and there are several factors which create problems in determining the concentration of radionuclides in the aerosol state from data produced by the detector/MCA, particularly for the alpha particle radiation energy. Included are: 1) the presence of air in the gap between collector and detector which causes a broadening of the energy spectra, 2) interference from particulate matter on the collector, 3) inadvertent loss of particulate matter on internal surfaces of the CAM, and 4) interference in the spectral distribution caused by background alpha-emitters. It is the latter factor which often causes the greatest problems.

There have been many reports concerning the discrete (noncontinuous) measurement of radon progeny both attached to aerosols and unattached in chosen air samples. For example, in "An Evaluation Of Unattached Radon (And Thorium) Daughter Measurement Techniques," by Antoon W. Van Der Vooren, Anthony Busigin, and Colin R. Phillips, Health Physics 42, 801 (1982), the authors evaluate collection efficiencies of parallel plate, inertial impactor, and wire screen devices used for measurement of the unattached fraction of radon (or thoron) daughters for collection of the attached fraction of the aerosol. In "Measurement Of Charged And Unattached Fractions Of Radon And Thoron Daughters In Two Canadian Uranium Mines," by Charlett J. Busigin, Anthony Busigin, and Colin R. Phillips, Health Physics 44, 165 (1983), the authors utilize a cylindrical condenser to perform charged fraction measurements. Additionally, in "Experimental Measurements Of The Diffusion Coefficient Of $^{212}$Pb," by Y. F. Su, G. J. Newton, Y. S. Cheng, and H. C. Yeh, Health Physics 56, 309 (1989), the authors use a cylindrical diffusion tube and screens to measure deposition of radon progeny. None of these references teach the use of the apparatus employed therein for reducing the background of radon progeny for the purpose of making reliable aerosol radioactive emission activity determinations in ambient air in a continuous air monitor.

By contrast however, aerosol impactor devices have been used both for size characterization and analysis, and as a procedure for fractionating radon progeny from alpha emitting transuranics, thereby achieving background suppression. In "An On-Line Monitor For Alpha-Emitting Aerosols," by Thomas J. Yule, IEEE Transactions On Nuclear Science NS-25, 762 (1978), Yule reported the development of a CAM sampler utilizing a virtual impaction concept to separate a fine fraction of an aerosol sample from a coarse fraction. The fine fraction is discarded in the exhaust of the device without counting. A high sampling rate (10 CFM) is needed in this device to acquire a usable sample, since only 7% of the flow is actually filtered and counted. Two stages of virtual impaction are used to achieve a reported 50% cut point of about 2 $\mu$m. The disadvantage of this device include: a) a sizeable percentage of the TRU sample is lost along with the fine fraction containing the radon daughters that is discarded, with an attendant loss of sensitivity; b) the 10 CFM sampling rate requirement imposed by the inefficiency of collection cannot be supported in most large plutonium handling facilities where dozens to hundreds of CAMs must be operated from house vacuum; c) the additional costs and complexity of building and maintaining a two-stage virtual impactor offsets the gain in performance; d) operation of the second stage in the coarse fraction exhaust of the first stage leads to inadvertent losses of particles; and e) without any other means for removing radon daughters, the pass-through flow contains an extra burden of radioactive materials.

Another version of an impactor CAM device utilizes a large, high volume annular impactor to selectively deposit coarse size particulates on a grease-coated planchet directly below the jet. Since this is a high volume sampling device (>10 CFM), it has been difficult to apply widely (See, e.g., "A Continuous Monitor For Prompt Detection Of Airborne Plutonium," by J. M. Alexander, Health Physics 12, 553 (1966)). A disadvantage of these devices is that typically, the detection principle is gross alpha counting of the sample planchet which does not yield energy distribution data. Hence, no further data processing to better refine the transuranic content estimate is possible. This can be a problem in some applications where the large particles carry radon progeny with them to the collection substrate. Another disadvantage of this type of impactor is that while it can fractionate an aerosol at a somewhat lower cut point than a virtual impactor, it is subject to solid particle reentrainment problems. And finally, these devices are notorious for producing a nonhomogeneous deposit on the collector which under some circumstances can reduce the sensitivity of the detection process.

A third related approach based on impaction is found in a CAM device described in "The ZPR-9 Airborne Plutonium Monitoring System," by Gordon K. Rusch and William P. McDowell, IEEE Transactions On Nuclear Science NS-23, 690 (1976). This is a modification of the Alexander, supra design. A large volume of sampled air is directed through an annular jet to an impactor surface where large particles are deposited. The majority of the flow is diverted through 180° and contains the radon progeny and the fine fraction of the plutonium aerosol which is discharged from the apparatus uncounted. The impactor surface is a passivated, diffused-junction silicon solid-state alpha detector. Such an apparatus permits the direct detection of plutonium and background alpha emissions with an energy-discriminating detector. In addition to background suppression by removal of a fraction of the radon progeny in the fine fraction, additional signal and data processing can then be employed to yield further background compensation. A thin grease coating applied daily to the surface of the detector reduces particle bounce and reentrainment. Disadvantages of this device are that a large sampling rate is required, a large fraction of the plutonium sample is discarded uncounted, and energy resolution of the detector deteriorates in time due to accumulated deposits on the detector and the grease coating.

Accordingly, it is an object of the present invention to provide an apparatus having a reduced background for determining the radioactive emission activity of aerosols which fractionates high-mobility radon progeny without an unacceptable loss of larger particles, such that virtually the entire sample, minus substantially all of the high-mobility radon progeny, is collected and counted.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus having reduced background for measuring radioactive emission of aerosol particles having a chosen size in air samples of this invention includes a substantially planar filter for collecting aerosol particles from air drawn therethrough, a substantially planar radioactive emission detector responsive to the kinetic energy thereof and disposed parallel to and spaced-apart from the filter for detecting radioactive emissions from aerosol particles trapped on the filter, means for establishing flow of the air sample to be investigated through the filter after passing through the volume between the filter and the detector, at least one inlet fractionating screen disposed upstream from the filter in the air flow and having a mesh size suitable for removing radon progeny particles which interfere with the radioactive emissions from the aerosol particles to be measured.

It is preferred that the apparatus include at least one nozzle for forming a turbulent air flow in the sample of air under investigation disposed in the air flow downstream of the inlet fractionating screen.

Preferably, at least one dichotomous virtual impactor is employed, in place of the nozzle, for further reducing the background of interfering radon progeny aerosol particles, the virtual impactors being disposed downstream from the inlet fractionating screen in the air flow, whereby the air flow is divided into a substantially undeflected air flow and a deflected air flow.

It is also preferred that the dichotomous virtual impactors further include at least one second-stage fractionating screen disposed in the deflected air flow for removing particles having a chosen size therefrom, and means for returning the resulting twice-filtered air to the undeflected air flow.

Preferably also, the apparatus includes an electrical condenser for removing charged particles from the air sample under investigation disposed in the air flow downstream from the nozzles or dichotomous virtual impactors, whichever are employed, and upstream from the volume.

In a further aspect of the present invention, in accordance with its objects and purposes, the apparatus having reduced background for measuring radioactive emission of aerosol particles having a chosen size in air samples of this invention includes a substantially planar filter for collecting aerosol particles from air drawn therethrough, a substantially planar radioactive emission detector responsive to the kinetic energy thereof and disposed parallel to and spaced-apart from the filter for detecting radioactive emissions from aerosol particles trapped on the filter, means for establishing flow of the air sample to be investigated through the filter after passing through the volume between the filter and the detector, at least one dichotomous virtual impactor for reducing the background of interfering radon progeny aerosol particles, the virtual impactors being disposed upstream from the volume in the air flow, whereby the air flow is divided into a substantially undeflected air flow and a deflected air flow, at least one fractionating screen disposed in the deflected air flows for removing aerosol particles having a chosen size therefrom, and means for returning the resulting filtered air to the undeflected air flow.

Preferably, the aerosol radioactive emission activity measurement apparatus of the present invention further comprising an electrical condenser for removing charged particles from the air sample under investigation disposed downstream from the virtual impactors and upstream from the volume in the air flow.

Benefits and advantages of our invention include the improvement in signal-to-noise ratio for detection of TRU materials associated with aerosols by reducing the background of radon progeny without significantly reducing the radioactivity-bearing aerosol concentration, thereby permitting the effective use of background compensation algorithms for improving the quality of alarm signals intended to warn personnel of potentially harmful concentrations of TRU or other radionuclide materials in the ambient air.

BRIEF DESCRIPTION OF THE DRAWINGS

The accompanying drawings, which are incorporated in and form a part of the specification, illustrate three embodiments of the present invention and, together with the description, serve to explain the principles of the invention. In the drawings.

DETAILED DESCRIPTION OF THE PREFERRED EMBODIMENTS OF THE INVENTION

Briefly, the present invention includes the improvement of the signal-to-noise ratio of alpha particle continuous air monitor (CAM) samples by physically separating the small diameter, high mobility radon progeny aerosol particles from the rest of the incoming CAM sample prior to sample collection and counting. Suppression of the background contribution to the count considerably improves the performance of background compensation algorithms. Larger size, less mobile components of the aerosol size distribution are relatively unaffected by the separation processes, thus maintaining a high efficiency for sample collection. Physical separation is achieved by exploiting three particle characteristics of the heterogeneous aerosol entering a CAM inlet: 1) particles will have different inertial properties due to their size, shape, and density; 2) particles will have different electrical charges which change their mobility in an electrical gradient; and 3) particles will have different physical diameters which change their diffusion properties.

Figure 1A:
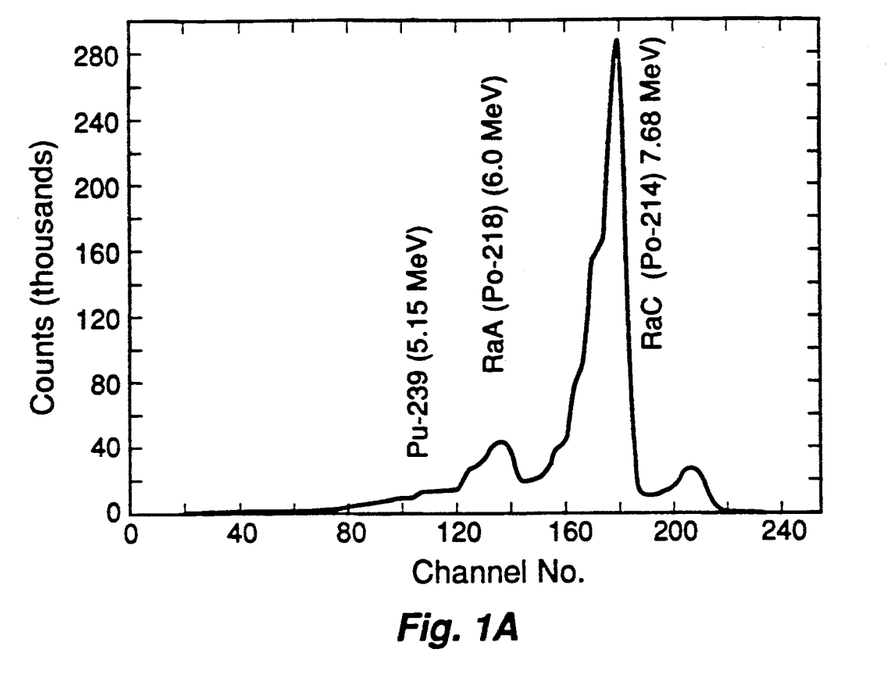
FIG. 1a is a multichannel analyzer spectrum (counts versus energy) from a significant quantity of Pu-239 deposited in a continuous air monitor in the presence of a high background of radon progeny in room air.
Figure 1B:
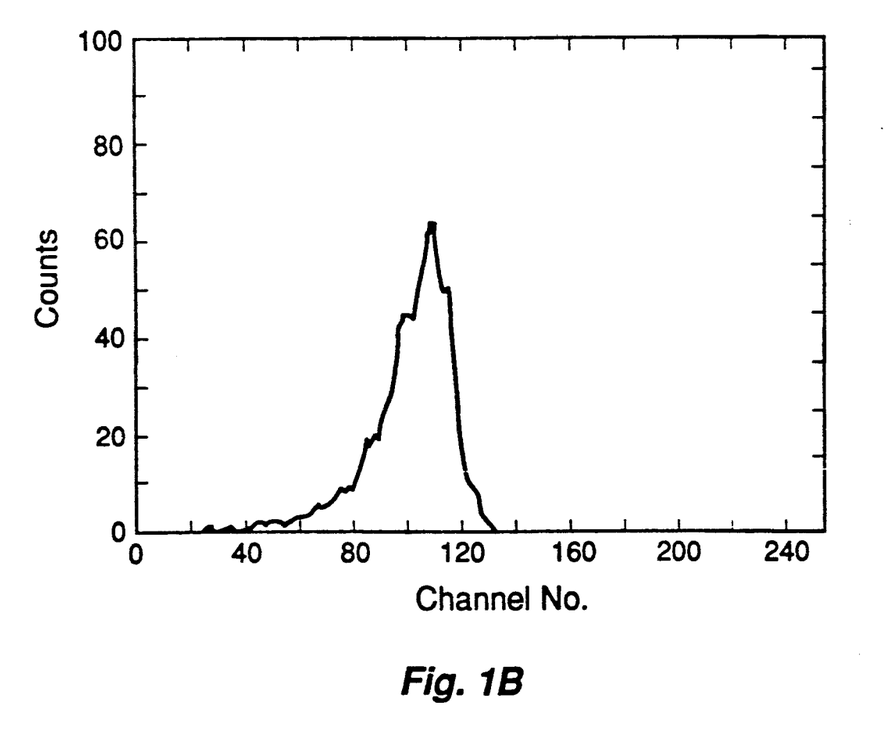
FIG. 1b shows the same measurement without the introduction of the radon progeny. Note the change in the count scale between the two curves.
Figure 2:
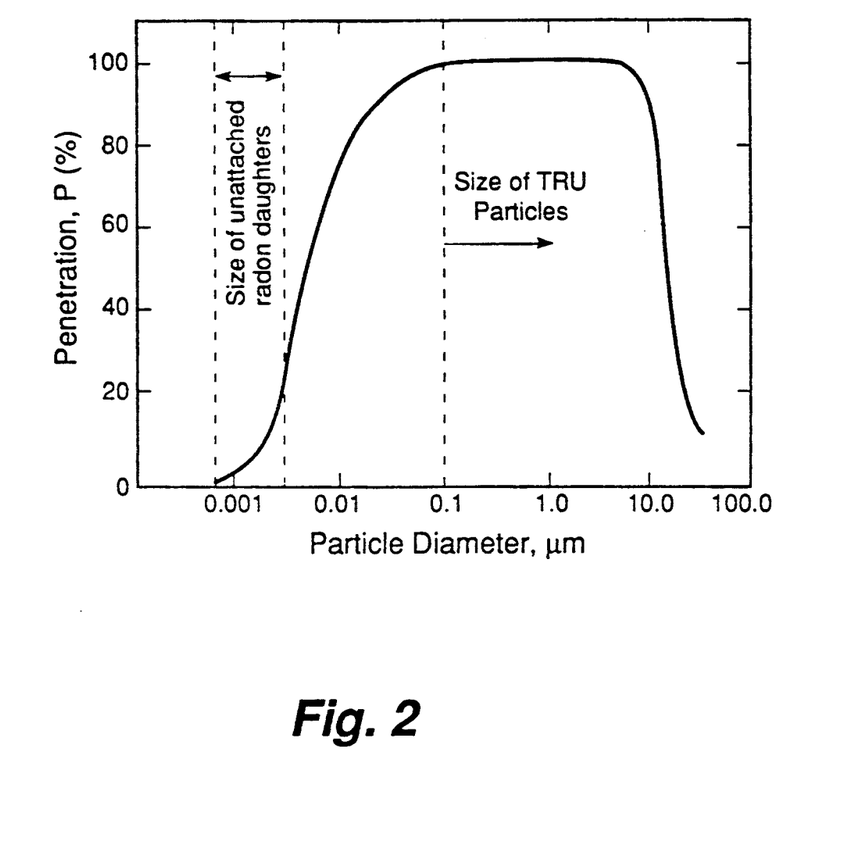
FIG. 2 shows the penetration percent of aerosols versus particle size for diffusion screens utilized in the present invention illustrating the fact that there is a range of particle sizes which pass through such screens with little attenuation. Since the bulk of transuranic aerosol particles found in air samples have diameters between 0.1 and 15 microns, such filters operate most efficiently in passing these particles, while removing smaller and larger interfering species.

Reference will now be made in detail to the present preferred embodiments of the invention, examples of which are illustrated in the accompanying drawings. All similar or identical structure will be identified using the same call-out numbers. Turning now to the Figures, FIG. 1 shows an example of the effect of background alpha emitters on the detection of plutonium (Pu-238, 239). A filter loaded with a known alarmable level of Pu-239 was used in a standard CAM apparatus to collect an overlaid sample of radon progeny in room air to provide a high background. The resultant multichannel energy spectrum (FIG. 1a, counts vs. channel number, or energy) developed by multichannel analysis of the alpha emissions (Pu+radon progeny) shows the dominance of the radon progeny background over the Pu-239 contribution, which occurs in channels 40-125. The Pu-239 region of the energy spectrum is identified in FIG. 1b, which is a spectrum taken of the filter before the addition of the radon progeny; note the change in scale, counts replacing thousands of counts. The interference arises, at the position of the 5.15 to 5.5 MeV plutonium spectral peaks as the low-energy tail of the 6.0 MeV peak of the radon progeny. As FIG. 1 illustrates, the background counts in the region of interest can be hundreds of times of those counts from the plutonium, giving rise to the signal-to-noise ratio problem the present claimed invention has successfully overcome.

Improvement in the signal-to-noise ratio can be obtained by either suppression of the background contributions, or by background compensation through the use of data processing algorithms which compute a background correction to the gross counts in the plutonium region of interest in the energy spectrum. That is, the low-energy tail of the 6.0 MeV has an approximate exponential form, so that through curve-fitting and extrapolation, an estimate may be made of the background count which can be subtracted from each channel of the plutonium region of interest.

As stated hereinabove, physical separation may be achieved by exploiting three particle characteristics of the heterogeneous aerosol entering a CAM inlet. These properties can be represented by three well-known characteristics:

a. the particle stopping distance in air: the distance traveled in the forward direction before coming to rest in the surrounding air for a particle having an initial velocity U. The stopping distance L for a particle of diameter D is given by $$L = \rho U C D^2 / 18 \mu$$

More specifically, in applications to the impactors to be discussed below, a dimensionless measure, the Stokes number, is used. The Stokes number for a jet-forming element of diameter W is $$Stk = 2L/W, \text{ so that}$$

$$Stk = \rho U C D^2 / 9 \mu W;$$

b. the particle electrical mobility $Z_e$:

$$Z_e = Cne/3\pi\mu D;$$

and c. The particle diffusion mobility Z:

$$Z = C/3\pi\mu D.$$

where in the above expressions C=Cunningham-Stokes slip correction, n=number of electrical charges, e=-value of the elementary charge, $\mu$=gas viscosity, $\rho$=particle density, and D=particle diameter. The theoretical and empirical basis for screen fractionation is described more fully in "On Improving The Validity Of Wire Screen 'Unattached' Fraction Rn Daughter Measurements," by Mukund Ramamurthi and Philip K. Hopke, Health Physics 56, 189 (1989).

The present claimed invention includes a multistage fractionator system by applying all three of these principles to efficiently achieve a high degree of fractionation. For applying the inertial effect, the incoming aerosol sample is accelerated through jet-forming elements. The resulting aerosol jet is deflected so that a given streamline is caused to execute a right angle change in direction. Particles having a large diameter or large density (or both) have a corresponding large stopping distance and hence tend to leave the deflecting airstream and separate from the remaining smaller (or less dense) particles. For applying the electrical mobility effect, the air stream is passed through a charged cylinder which creates an electrical gradient in which particles having a large $Z_e$ rapidly move from the streamlines to a charged or grounded surface and are removed. For applying the diffusion mobility effect, the airstream is passed through fine mesh screens where the very small diameter particles with high-Z rapidly diffuse from the streamlines to the screen surfaces while the remaining particles pass through. Due to the unattached radon progeny being monomolecular particles or small molecular clusters, they are much smaller and have higher diffusion velocity than most aerosols; particularly, aerosols of transuranic materials.

The advantages associated with using a screen are illustrated in FIG. 2, where calculated results are shown for the penetration of various sized aerosol particles through a screen comprised of 120 μm diameter wires when the superficial air velocity is 2 cm/s. Unattached radon daughters have particle sizes in the range of 0.5–3 nm, a range for which the screen will permit only 0–30% penetration. Penetration through the screen is high for particles in the size range of 0.1–10 μm diameter, a range which corresponds to that of transuranic aerosol particles. The basis for the plutonium aerosol size assumptions is discussed in "Plutonium Aerosol Size Characteristics," by J. C. Elder, M. Gonzales, and H. J. Ettinger, Health Physics 27, 45 (1974). Other researchers have observed that accidental releases of plutonium lead to aerosol particles having sizes greater than 0.1 μm aerodynamic equivalent diameter. Particles having sizes greater than 10 μm aerodynamic equivalent diameter are not of significance in sampling since they exhibit reduced penetration to the thoracic region of the human respiratory system, and as a consequence, are not as important a challenge to human health as smaller particles. FIG. 2 shows that the radon progeny can be stripped from the aerosol size distribution, while the larger, TRU-bearing particles will penetrate the screen.

Thus, a combination of these separation processes will be very effective in fractionating actinide particles from radon daughter particles. In fact, experiments conducted with fractionators based on these principles have shown that background counts from radon progeny on the CAM filter can be reduced by as much as 95%, provided the radon progeny are relatively free from attachment to larger inert particles in the air. It should be mentioned at this point that the present invention will not usually result in the elimination of the use of data processing algorithms which compute a background subtraction quantity for the plutonium region of interest Rather, by removing a large fraction of the radon progeny from the filter sample, an improved signal-to-noise ratio is achieved, which results in an improved electronic background compensation.

Turning now to FIG. 3*a*, which is a schematic representation of a cross section of the vertical section of the circularly symmetric CAM head of the simplest embodiment of the present claimed invention, two fractionating elements are employed: a 100 mesh inlet screen, which provides for removal of high mobility (high-Z) radon progeny fractions by mechanical diffusion, and an electrical condenser formed by a charged coaxial cylinder in-line with the body of the CAM, which provides for the removal of charged radon progeny, which have high electrical mobility (high-$Z_e$). While the embodiment illustrated in FIG. 3*a* would be expected to provide excellent removal of radon progeny under conditions in which these radionuclides are unattached and highly-charged (that is, freshly-formed, and in low-humidity environments), improved removal performance might be required in other conditions. FIG. 3*b* shows the addition of a nozzle to the apparatus of FIG. 3*a* in order to introduce turbulence into the air flow for the purpose of improving the uniformity of aerosol deposition on the filter. As only a cross section of the cylindrically symmetric apparatus is illustrated, a plurality of nozzles will be employed.

FIG. 3*c* illustrates a more sophisticated fractionating element which will produce an improved radon progeny removal based on the inertial separation principle. As shown in this Figure, once the incoming sample passes through the first inlet screen fractionator (which can still have an important role to play), it moves into jet-forming elements of a dichotomous virtual impactor similar in part to that described in Yule, supra. The function of the virtual impactor is to provide for the temporary separation of a large (or high-density) particle fraction from the sample so that a second stage of finer mesh size diffusion screening can be applied to the deflected portion of the sample without losses as a result of impact of these larger particles on the screens. It is known that approximately 10% of the flow passes undeflected through the impactor, while about 90% of the stream passes through the second stage screens before being caused to recombine with the undeflected stream. One of the major differences in the use of the virtual impactor according to the teachings of the present invention from that of Yule, is the diversion of the deflected stream back into the undeflected stream, and the employment of further fractionating screens. Yule simply pumps the deflected streams away. It should also be mentioned at this point that, although only a cross section of the present apparatus is shown, a plurality of such impactors are likely to be employed. Calculations show that the second stage screen might be constructed with several stacked, 400-mesh screens without excessive loss of particles of interest which have been deflected into the screens from the virtual impactor. The remaining radon progeny in the recombined flow arriving at the electrical condenser are principally those which move unimpeded through the virtual impactor stage in the coarse fraction flow (10% of the total flow). If any of these components is charged, they will be removed by the action of the electric field.

A critical feature of this invention is the fact that no part of the flow is discharged without passing through the filter. Both the major and minor flows recombine and are filtered and counted. From virtual impactor design theory, it can be calculated that, for example, a 0.15 cm diameter jet nozzle (in an array of eight nozzles sampling at 1 CFM) will have a 50% cut of about 1.5 μm. Smaller particles will be diverted to the screens where, as previously seen, particles smaller than 0.08 μm will be removed by diffusion. Above that size, particles in the aerosol will pass through the screens with minor losses and rejoin the larger size fraction Therefore, the majority of transuranic particles in a typical sample will be collected and counted, since most of such particles are in larger size fractions, averaging around 1 to 3 μm in diameter. At the same time, the largest fraction of the unattached radon progeny (0.04 μm and below) susceptible to removal by diffusion (electrical and mechanical) will be eliminated.

A critical feature of the present invention is the fact that no portion of the flow is discharged without filtration for counting. Both the undeflected and deflected flows are recombined and counted. From the theory of virtual impactors, one can calculate that a 0.15 cm diameter jet nozzle (in an array of eight nozzles sampling at 1 cfm) will have a 50% cut of about 1.5 μm. Smaller particles will be diverted to the screens where particles up to 0.08 μm will be removed by diffusion, as has been described hereinabove. Above that size, particles in the aerosol will pass through the screens with minor losses and rejoin the undeflected fraction.

Having generally described the present invention, the following specific examples are given as a further illustration thereof.

EXAMPLE I

Figure 3A:
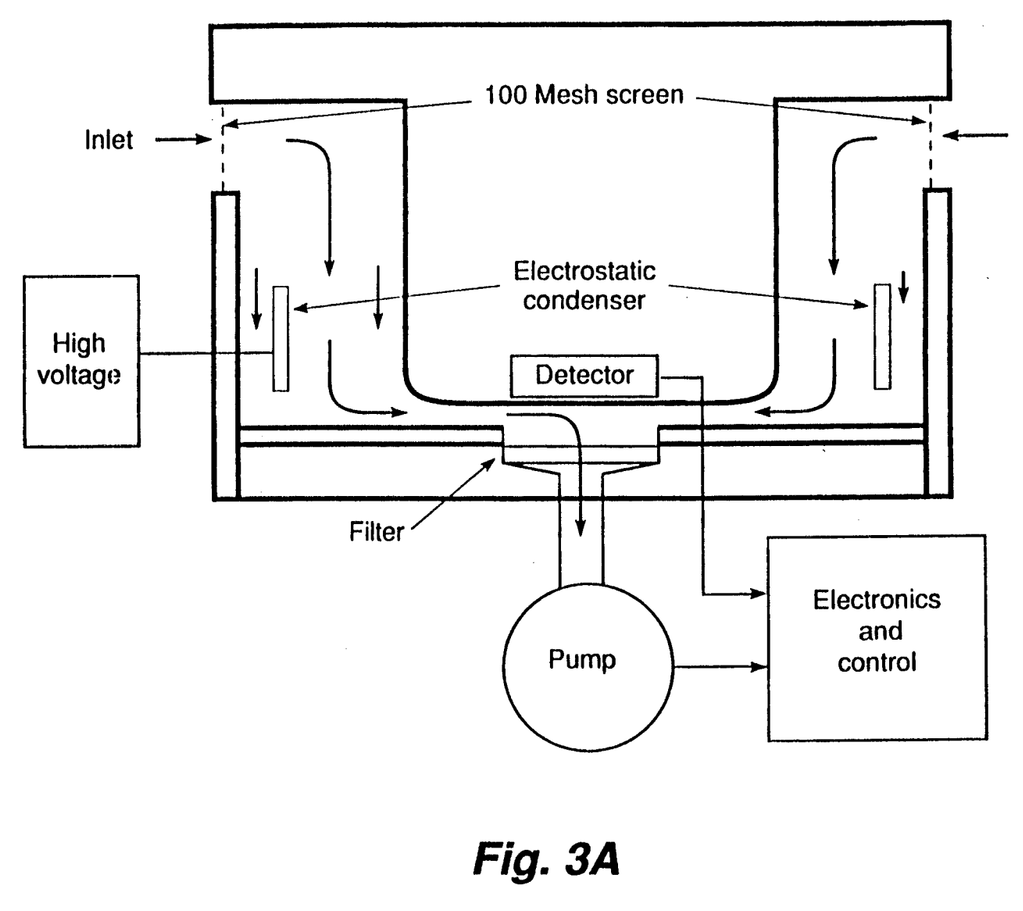
FIG. 3a is a schematic representation of a cross sectional view of the simplest embodiment of a reduced background continuous air monitor illustrating the location of the input screen and electrical condenser fractionating elements of the present invention.
Figure 3B:
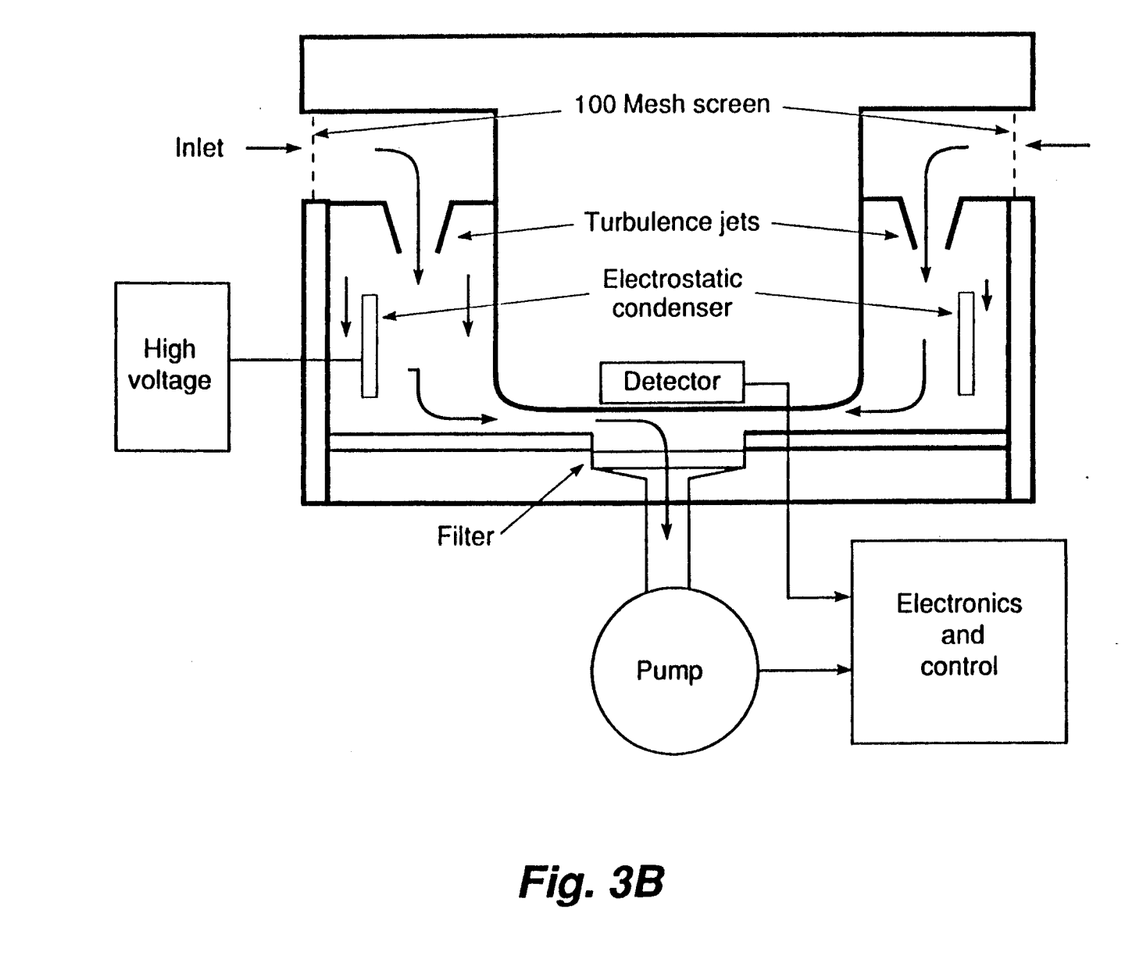
FIG. 3b is a schematic representation of a cross sectional view of a more efficient continuous air monitor than that described in FIG. 3a showing the addition of a nozzle which improves the uniformity of material deposition on the filter.
Figure 3C:
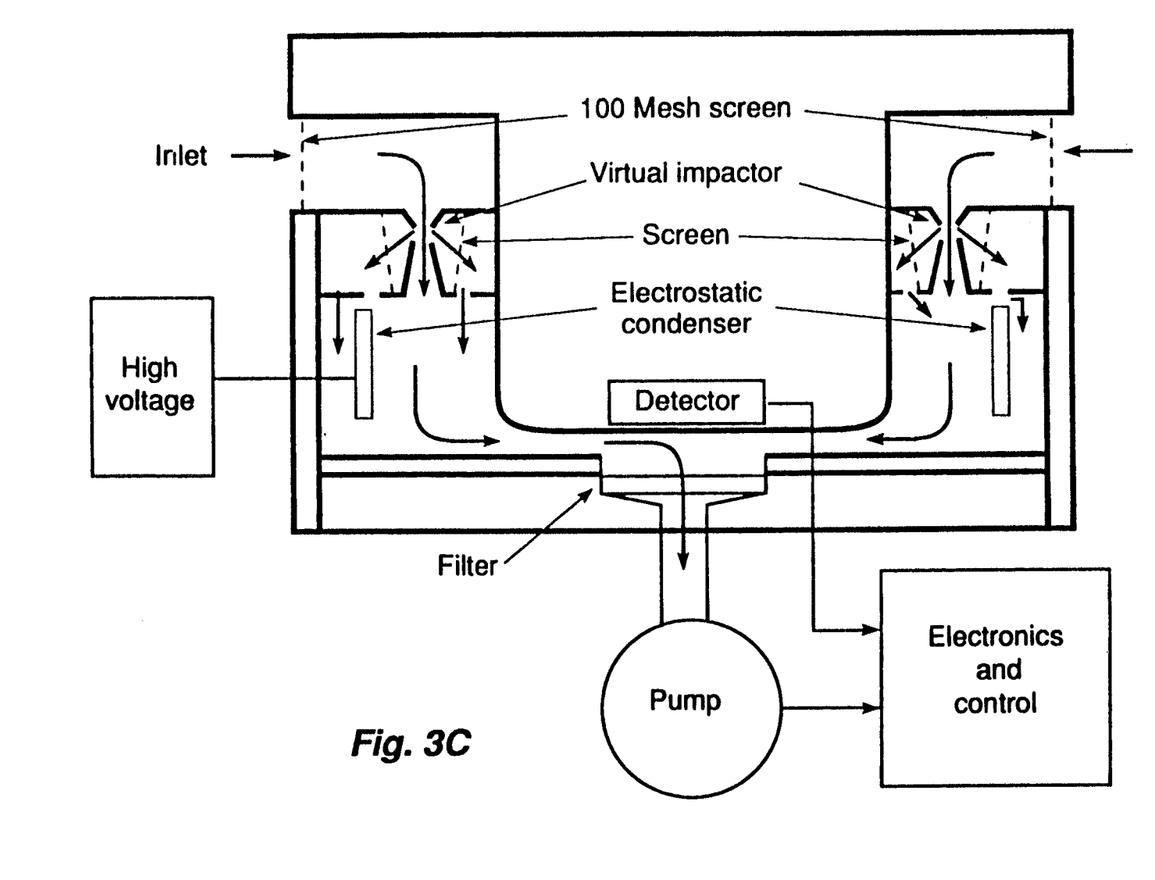
FIG. 3c is a schematic representation of a cross sectional view of a continuous air monitor employing a dichotomous virtual impactor to improve the fractionation efficiency of the present invention.
Figure 4:
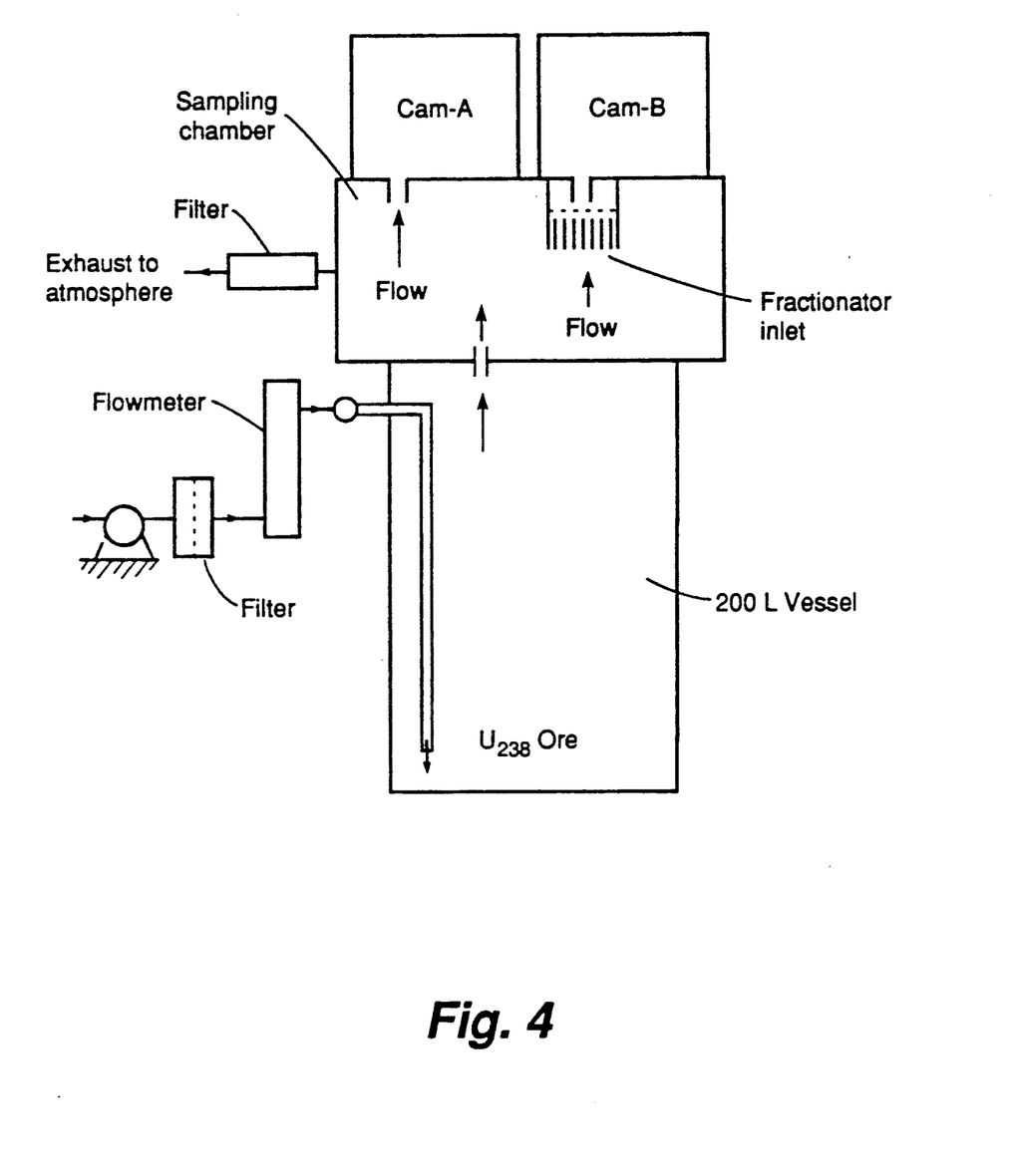
FIG. 4 is a schematic representation of the apparatus used to test the continuous air monitor of the present invention.
Figure 5:
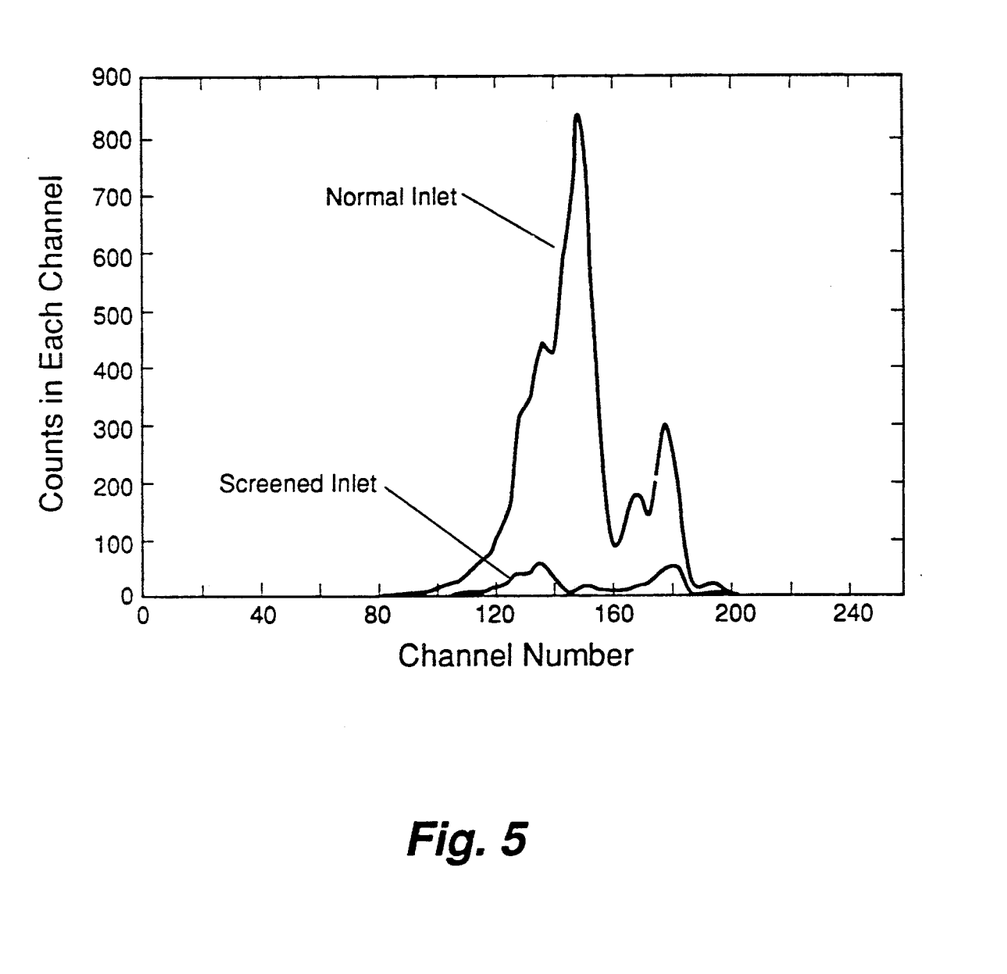
FIG. 5 shows a comparison of the transmission of radon progeny to the filters of CAM samplers fitted with a diffusion screen and with no diffusion screen.
Figure 6:
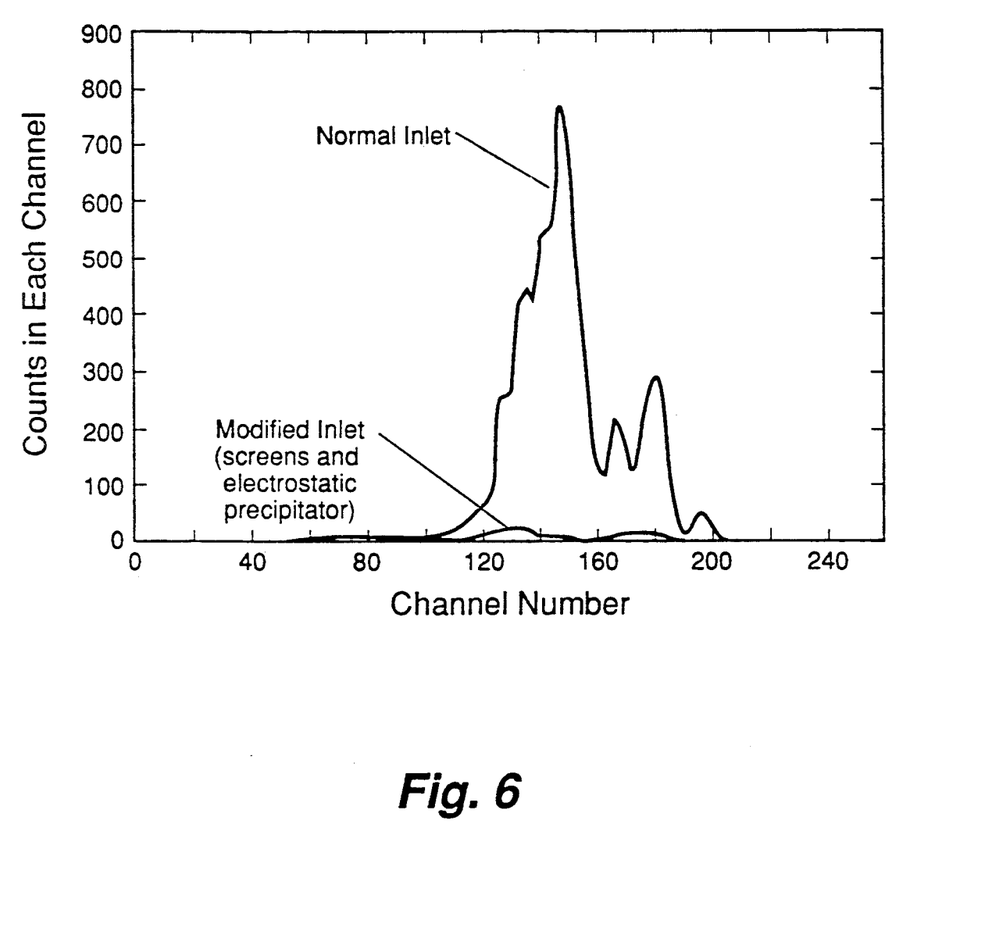
FIG. 6 shows a comparison of the transmission of radon progeny to the filters of CAM samplers having no fractionating inlet and an inlet fitted with a screen and an electric condenser.

Turning now to FIG. 4, high grade uranium ore was placed in a 200 L vessel as a means of generating radon daughters. Filtered room air was passed over the uranium ore and forced into a sampling plenum located over the vessel. Two commercial CAMs were modified and mounted such that their inlets were inside of the plenum. One of the CAM samplers was fitted with an experimental fractionator (consisting of a screen and/or an electrical condenser as described in FIG. 3a, hereof) on its inlet, and the other was operated without a fractionator. The resultant energy spectra are shown in FIGS. 5 and 6, where it may be noted the screened inlet reduces the total number of counts in all channels by 90%, and the combination of screen together with an electrical condenser reduces the total count by 95%. In these figures, the major peak corresponds to the 6 MeV radon progeny peak. Experiments were also conducted with partially aged radon progeny, some of which were attached to room aerosols. The mobility of the attached radon progeny is lower than the unattached radon progeny in the vessel, and the observed reduction was about ⅓ of the total counts as a result of the fractionators. Experiments were also conducted with the apparatus described in FIG. 3b, hereof (no virtual impaction separation). In these experiments the radon from the ore drum was circulated through a buffer tank into the test chamber containing a CAM which could be operated with either screen and/or voltage on. Very similar results were obtained to those which were observed with the paired CAM and experimental fractionator (over 90% reduction).

The data for the comparative testing of the pair of continuous air monitors, one with an experimental fractionating device on its inlet, and the other without, are set forth in Table 1. The ratio of total counts in the entire alpha spectrum was computed for each of several combinations of screen and voltage configurations. The ratios are measures of the radon progeny penetration percentage through the fractionating stages as configured in each test. Efficiency is the difference between the ratio and 100%. It may be noted that with no screen and no voltage, a substantial fraction of the freshly formed radon progeny is removed. This is because in the experimental apparatus the condenser plates were only ⅛ in. apart and 1 in. long, and thus served as diffusional collectors when the voltage was not applied.

TABLE 1

Ratio of the Total Alpha Particle Counts Sensed by a CAM Sampler with a Fractionating Inlet to the Counts Sensed by a Standard Inlet. CAMs Used in the Experiments Were Eberline Instrument Corp. Alpha-6 Monitors.

| Sample Source | Configuration and Operating Conditions of the Fractionating Inlet | Ratio, % |
|---|---|---|
| 200 L Vessel (Freshly formed RDs) | No screen, no voltage across condenser | 25.0% |
| | No screen, 400 volts | 6.9 |
| | No screen, 2000 volts | 4.4 |
| | 100 mesh, no voltage | 9.0 |
| | 100 mesh, 400 volts | 4.5 |
| Room Air Mixing of Vessel Effluent (Partially aged RDs) | No screen, no voltage | 94.5 |
| | 100 mesh screen, no voltage | 88.2 |
| | 100 mesh, 400 volts | 63.3 |
| | No screen, 400 volts | 64.9 |

EXAMPLE II

The testing of aerosol penetration through the screen elements of the experimental apparatus was performed using approximately monodisperse aerosol particles of oleic acid which were tagged with an analytic tracer, sodium fluorescein. The results of tests with 100-mesh screens at two different velocities is presented in Table 2. Note that greater than 50% penetration of 10 μm aerodynamic equivalent diameter particles is obtained even at high face velocities. Also note that there is clear evidence of a loss of large particles as size increases. These losses increase with finer mesh size and increasing numbers of layers of screen. In Table 3, wind tunnel test data from a screened inlet having two layers of 60 mesh screen are shown. These data are for 10 μm particles impinging at several face velocities. Note that for the two layer 60-mesh screen, the penetration (60%) was less than for a single 100-mesh screen operating at nearly the same face velocity of 6 cm/sec (i.e., 81.3% from Table 1).

Experimental findings clearly indicate that much finer mesh size or layer mesh would be inappropriate for the inlet. But if a virtual impactor is used to isolate the larger size fraction while the finer particles are screened, then a more effective device would result.

TABLE 2

Penetration of Aerosol Particles through a 100 Mesh Screen at Superficial Velocities of 6 and 24 cm/sec.

| Aerodynamic Particle Diameter, μm | Penetration, % Superficial Velocity | |
|---|---|---|
| | 6 cm/s | 24 cm/s |
| 5 μm | 100.1% | 88.1% |
| 10 | 81.3 | 57.3 |
| 15 | 60.0 | 23.1 |

TABLE 3

Wind Tunnel Tests of an Inlet Fitted with Two Layers of 60-Mesh Screen

| Wind Speed | Sampler Flow Rate | Screen Superficial Velocity Based On Sampler Flow Rate | Penetration, % |
|---|---|---|---|
| 2 m/s | 2 cfm | 6.8 cm/s | 66% |
| 0.3 | 1 | 3.4 | 58 |
| 0.3 | 2 | 6.8 | 72 |
| 0.3 | 4 | 13.6 | 69 |

EXAMPLE III

The results of tests of screen and electrical condenser effects in an operational configuration are presented in Table 4 for both 5-minute and 8-hour continuous sampling; the latter simulates the long-term sampling condition. Note that again the screen removed 94% of the unattached radon progeny, and that the application of voltage to the electrical condenser removed an additional 2% (8-hour data). From the fourth test (no screen, 225 volts applied), it can be observed that by itself, the electrical condenser removed about 3.6% (8-hour data).

EXAMPLE IV

Figure 7:
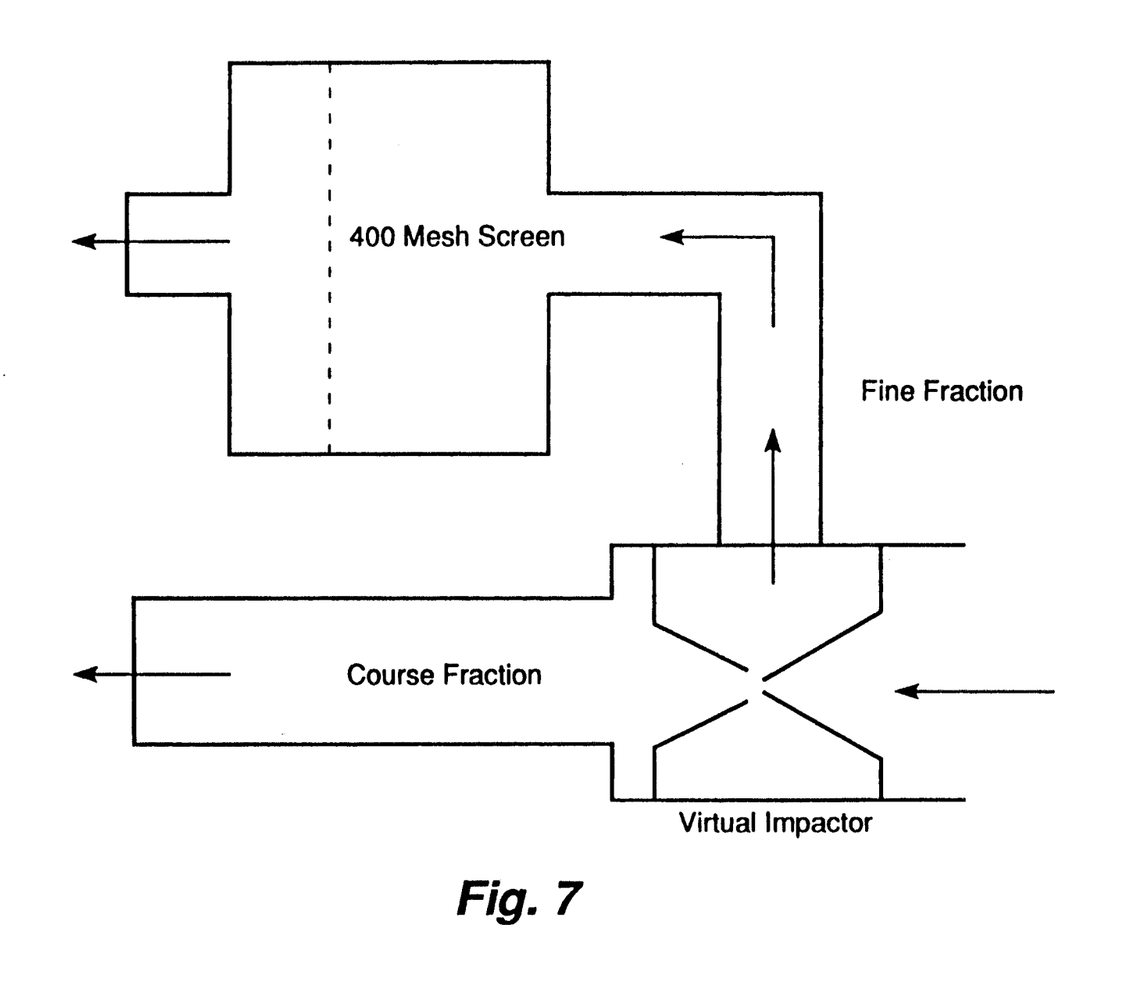
FIG. 7 is a schematic representation of an experimental virtual impactor utilized to test the screened impactor design of the present invention.

Tests of an experimental virtual impactor with a 400-mesh screen in the fine particle flow path have been accomplished as a demonstration of the functionality of the virtual impactor/second-stage screen concept, and to obtain design data for construction of an operational CAM incorporating these devices. A schematic representation of the device is shown in FIG. 7. The resulting data, presented in Table 5, are averages of several measurements of radon progeny sampled from either the coarse or fine particle flows.

TABLE 4

| CONFIGURATION | | | TOTAL COUNTS | | PENETRATION PERCENT | |
|---|---|---|---|---|---|---|
| Velocity Inlet cm/s | Screen Mesh | Condenser Voltage Volts | 5 min | 8 hrs | 5 min | 8 hrs |
| 2.6 | None | None | 332 | 131,600 | 100.0 | 100.0 |
| 2.6 | 100 | None | 35 | 7,926 | 10.9 | 6.0 |
| 2.6 | 100 | 225 | 49 | 5,298 | 15.2 | 4.0 |
| 2.6 | None | 225 | 271 | 126,853 | 84.2 | 96.4 |
| 2.6 | 100 plus 45 μm nylon | None | 50 | 5,479 | 15.5 | 4.2 |
| 1.3 | 100 | None | 22 | 2,697 | 13.7 | 4.0 |

The data labeled RaA are integral 5-minute counts in the 6.0 MeV peak (Po-218) and those labeled RaC' are integral counts in the 7.68 MeV peak (Po-214). These data demonstrate that the unattached fraction of radon progeny can be deflected by a virtual impactor and those in the fine particle flow effectively removed by a fine mesh screen (here just a single screen). The preliminary indications are that the RaC' radon progeny may be attached to (or form clusters of) larger particles than the RaA, which is expected since they occur much later in the decay chain, and hence have a much longer period to agglomerate or attach to inert particles. It should be noted that even if these radon progeny do more preferentially pass through the virtual impactor along with the coarser transuranic particles, the effect of the separation process will not be substantially diminished, since it is the 6.0 MeV emissions from the radon progeny which are responsible for almost the entire interference effect since the 7.68 MeV peak is far removed from the actinide emissions (5 to 5.5 MeV).

TABLE 5

Virtual Impactor Test Apparatus Data. Filter samples were obtained alternatively between the coarse fraction and fine fraction flows. Samples were taken for 5 minutes, and after 1 minute delay were counted.

| Test Condition | Average Counts | | |
|---|---|---|---|
| | Total Radon Daughter Count | RaA Count | RaC' Count |
| No Screen | 110.5 | 97.5 | 13.5 |
| 400 mesh | 23.3 | 16.7 | 6.7 |
| Background | 12.5 | 10.0 | 2.5 |
| Penetration ratio % | 11.0% | 7.7% | 38.2% |

The foregoing description of three preferred embodiments of the invention has been presented for purposes of illustration and description. It is not intended to be exhaustive or to limit the invention to the precise form disclosed, and obviously many modifications and variations are possible in light of the above teaching. Clearly, it would be apparent to artisans in the field of radiation monitoring that the present invention is applicable to radiation monitoring of other than alpha-particle radiation. Moreover, although the air flow through the collecting filter is described hereinabove as being effected by the use of a vacuum pump, it would be apparent to those skilled in the art of radiation monitoring, after carefully reviewing the present disclosure, that such an air flow could be established by utilizing a pressure-generating apparatus as the air sampler. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. An apparatus having reduced background for measuring radioactive emission of aerosol particles having a chosen size in air samples, said apparatus comprising in combination:

a. substantially planar filter means for collecting aerosol particles from air drawn therethrough;

b. substantially planar radioactive emission detection means responsive to the kinetic energy thereof and disposed parallel to and spaced-apart from said filter means for detecting radioactive emissions from aerosol particles located in the vicinity of the surface of said filter means facing said detection means, the surface of said filter means facing said detector means and the surface of said detector means facing said filter means forming a volume;

c. means for establishing flow of the air sample to be investigated through the volume and subsequently through said filter means; and d. fractionating screen inlet means disposed upstream from the volume in the air flow and having a mesh size suitable for removing radon progeny particles which interfere with the radioactive emissions from the aerosol particles to be measured.

2. The aerosol radioactive emission activity measurement apparatus as described in claim 1, further comprising electrical condenser means for removing charged particles from the air sample under investigation disposed in the air flow downstream from said fractionating screen inlet means and upstream of the volume.

3. The aerosol radioactive emission activity measurement apparatus as described in claims 1 or 2 further comprising nozzle means for forming a turbulent air flow in the sample of air under investigation disposed in the air flow downstream of said fractionating screen inlet means.

4. The aerosol radioactive emission activity measurement apparatus as described in claim 3, wherein the aerosols under investigation are selected from the group consisting of plutonium-bearing aerosols, uranium-bearing aerosols, aerosols of other transuranic elements, aerosols bearing fission products, aerosols bearing activation products, and mixtures thereof.

5. The aerosol radioactive emission activity measurement apparatus as described in claim 4, wherein said fractionating screen inlet means is approximately 100 mesh.

6. The aerosol radioactive emission activity measurement apparatus as described claim 1, further comprising dichotomous virtual impactor means for further reducing the background of interfering radon progeny aerosol particles, said virtual impactor means being disposed downstream of said screen inlet means in the air flow, whereby the air flow is divided into a substantially undeflected air flow and a deflected air flow.

7. The aerosol radioactive emission activity measurement apparatus as described in claim 6, further comprising electrical condenser means for removing charged particles from the air sample under investigation disposed downstream of said dichotomous virtual impactor and upstream of the volume.

8. The aerosol radioactive emission activity measurement apparatus as described in claims 6 or 7 wherein said dichotomous virtual impactor means further comprises second-stage fractionating screen means disposed in the deflected air flow for removing particles having a chosen size therefrom, and means for returning the resulting twice-filtered air to the undeflected air flow.

9. The aerosol radioactive emission activity measurement apparatus as described in claim 8, wherein the aerosols under investigation are selected from the group consisting of plutonium-bearing aerosols, uranium-bearing aerosols, aerosols of other transuranic elements, aerosols bearing fission products, aerosols bearing activation products, and mixtures thereof.

10. The aerosol radioactive emission activity measurement apparatus as described in claim 9, wherein said fractionating screen inlet means is approximately 100 mesh.

11. An apparatus having reduced background for measuring radioactive emission of aerosol particles having a chosen size in air samples, said apparatus comprising in combination:

a. substantially planar filter means for collecting aerosol particles from air drawn therethrough;

b. substantially planar radioactive emission detection means responsive to the kinetic energy thereof and disposed parallel to and spaced-apart from said filter means for detecting radioactive emissions from aerosol particles located in the vicinity of the surface of said filter means facing said detection means, the surface of said filter means facing said detector means and the surface of said detector means facing said filter means forming a volume;

c. means for establishing flow of the air sample to be investigated through the volume and subsequently through said filter means;

d. dichotomous virtual impactor means for further reducing the background of interfering radon progeny aerosol particles, said virtual impactor means being disposed upstream from the volume in the air flow, whereby the air flow is divided into a substantially undeflected air flow and a deflected air flow;

e. fractionating screen means disposed in the deflected air flow for removing aerosol particles having a chosen size therefrom; and f. means for returning the resulting filtered air to the undeflected air flow.

12. The aerosol radioactive emission activity measurement apparatus as described in claim 11, further comprising electrical condenser means for removing charged particles from the air sample under investigation disposed downstream from said virtual impactor means and upstream from the volume in the air flow.

13. The aerosol radioactive emission activity measurement apparatus as described in claims 11 or 12, wherein the aerosols under investigation are selected from the group consisting of plutonium-bearing aerosols, uranium-bearing aerosols, aerosols of other transuranic elements, aerosols bearing fission products, aerosols bearing activation products, and mixtures thereof.

14. The aerosol radioactive emission activity measurement apparatus as described in claim 11, wherein said fractionating screen means is approximately 100 mesh.

* * * * *